United States Patent
Yamamoto et al.

(10) Patent No.: US 8,404,385 B2
(45) Date of Patent: Mar. 26, 2013

(54) MIXED CARBON MATERIAL INCLUDING GRAPHITE POWDER CORES AND SURFACE CARBON MATERIAL ON A SURFACE THEREOF AND NEGATIVE ELECTRODE FOR NONAQUEOUS SECONDARY BATTERY

(75) Inventors: Hiroshi Yamamoto, Ikeda (JP); Tatsuo Nagata, Ikeda (JP); Tooru Fujiwara, Nishimoniya (JP)

(73) Assignees: Nippon Steel & Sumitomo Metal Corporation, Tokyo (JP); Chuo Denki Kogyo Co., Ltd., Niigata (JP)

( * ) Notice: Subject to any disclaimer, the term of this patent is extended or adjusted under 35 U.S.C. 154(b) by 0 days.

(21) Appl. No.: 13/247,433

(22) Filed: Sep. 28, 2011

(65) Prior Publication Data

US 2012/0251888 A1    Oct. 4, 2012

Related U.S. Application Data

(63) Continuation of application No. PCT/JP2010/055328, filed on Mar. 26, 2010.

(30) Foreign Application Priority Data

Mar. 30, 2009   (JP) .................. 2009-081151

(51) Int. Cl.
  *H01M 4/583*  (2010.01)
  *C01B 31/04*  (2006.01)
  *H01B 1/04*   (2006.01)
(52) U.S. Cl. ............... 429/231.8; 423/449.1; 252/502
(58) Field of Classification Search ............. 429/231.8, 429/181, 162, 317, 50, 61, 231.4; 428/407; 252/182.1, 502; 423/449.1
See application file for complete search history.

(56) References Cited

U.S. PATENT DOCUMENTS

| | | | | |
|---|---|---|---|---|
| 5,527,518 A * | 6/1996 | Lynum et al. | ............. | 423/449.1 |
| 2002/0197534 A1 * | 12/2002 | Fukuda et al. | ............. | 429/231.4 |
| 2004/0048152 A1 * | 3/2004 | Yata et al. | .................... | 429/162 |
| 2004/0126668 A1 * | 7/2004 | Nishimura et al. | .......... | 429/317 |
| 2004/0137328 A1 * | 7/2004 | Kim et al. | ................. | 429/231.8 |
| 2005/0158550 A1 * | 7/2005 | Ohta et al. | .................... | 428/407 |
| 2005/0233204 A1 * | 10/2005 | Yata et al. | ....................... | 429/61 |
| 2006/0073387 A1 * | 4/2006 | Sakagoshi et al. | ......... | 429/231.8 |
| 2006/0147799 A1 * | 7/2006 | Hayashi et al. | ............ | 429/231.8 |
| 2006/0251955 A1 * | 11/2006 | Yata et al. | ....................... | 429/50 |
| 2007/0077496 A1 * | 4/2007 | Scott et al. | .................... | 429/326 |
| 2007/0196732 A1 * | 8/2007 | Tatebayashi et al. | ......... | 429/181 |

FOREIGN PATENT DOCUMENTS

| | | | |
|---|---|---|---|
| JP | 10294111 A | * | 11/1998 |
| JP | 2000138061 A | | 5/2000 |
| JP | 2001185147 A | | 7/2001 |
| JP | 2004111272 A | | 4/2004 |
| JP | 2005044775 A | | 2/2005 |
| JP | 2005294011 A | | 10/2005 |
| JP | 2006049288 A | | 2/2006 |
| JP | 2007165061 A | * | 6/2007 |
| JP | 2007220324 A | | 8/2007 |
| JP | 2007324067 A | | 12/2007 |
| JP | 2008140707 A | | 6/2008 |
| JP | 2009004139 A | | 1/2009 |
| JP | 2009037740 A | | 2/2009 |
| WO | 2010007898 A1 | | 10/2010 |

OTHER PUBLICATIONS

"Particle Compression and Conductivity in Li-Ion Anodes with Graphite Additives", Wang et al., Journal of the Electrochemical Society, 151 (9), p. A1489-A1498, 2004.*
Machine Translation of: JP 2007/165061 A, Kawakami et al., Jun. 28, 2007.*
Machine Translation of: JP 10294111 A, Yokoyama et al., Nov. 4, 1998.*
"The effect of compression on natural graphite anode performance and matrix conductivity", Striebel et al., Lawrence Berkeley National Laboratory, p. 1-18, Mar. 11, 2004.*

* cited by examiner

*Primary Examiner* — Basia Ridley
*Assistant Examiner* — Kenneth Douyette
(74) *Attorney, Agent, or Firm* — The Webb Law Firm

(57) ABSTRACT

The present invention provides a mixed carbon material which comprises carbon material A and carbon material B and which is a carbon material suitable for a negative electrode material which can provide a nonaqueous secondary battery having a low irreversible capacity and having a negative electrode with a high capacity and high charge acceptance. Carbon material A and carbon material B both have cores made of graphite powder and a surface carbon material in the form of at least one of amorphous carbon and turbostratic carbon adhered to or coated on at least a portion of the surface of the graphite powder. The compressed density is 1.80-1.90 g/cm$^3$ for carbon material A alone, 1.45-1.65 g/cm$^3$ for carbon material B alone, and 1.75-1.84 g/cm$^3$ for the mixed carbon material.

4 Claims, No Drawings ilk # MIXED CARBON MATERIAL INCLUDING GRAPHITE POWDER CORES AND SURFACE CARBON MATERIAL ON A SURFACE THEREOF AND NEGATIVE ELECTRODE FOR NONAQUEOUS SECONDARY BATTERY

CROSS-REFERENCE TO RELATED APPLICATIONS

This application is a continuation of International Patent Application Number PCT/JP2010/055328 filed Mar. 26, 2010, entitled "Mixed Carbon Material and Negative Electrode for Nonaqueous Secondary Battery" and designating, inter alia, the United States, which claims priority to Japanese Patent Application Serial No. 2009-081151, filed Mar. 30, 2009.

TECHNICAL FIELD

This invention relates to a graphite powder-based mixed carbon material suitable for a negative electrode of a nonaqueous secondary battery such as a lithium ion secondary battery and to a negative electrode for a nonaqueous secondary battery having a negative electrode material containing this carbon material.

In the present invention, a negative electrode material is one of the materials which constitute a negative electrode of the electrodes of a battery. A negative electrode is produced by a forming process such as compression of a mixture including the negative electrode material, a binder, and the like. During the use of a nonaqueous secondary battery having the resulting negative electrode, the negative electrode material receives and discharges positively charged particles (such as lithium ions) in the negative electrode.

In this description, a negative electrode of a nonaqueous secondary battery will sometimes be referred to for short as a negative electrode or as an electrode.

A carbon material is a particulate material having carbon as a main constituent. A negative electrode material according to the present invention contains a carbon material.

Graphite particles are also referred to as graphite powder. These terms refer to particles or powder made from artificial or natural graphite.

A graphite based material is one type of carbon material. It is the generic term for a particulate material made from graphite particles or graphite-based particles.

BACKGROUND ART

Graphite based materials in particulate form are the principal materials used as carbon materials in negative electrodes of lithium ion secondary batteries. The raw materials of graphite based materials include artificial graphite powder and natural graphite powder. It is more common to use artificial graphite powder, but there is increasing use of natural graphite powder from the standpoint of achieving a high degree of economy.

The most important challenge in the development of a lithium ion secondary battery is increasing the capacity of the battery. With the object of meeting this challenge, there has been much research aimed at increasing the capacity per unit mass of a graphite based material. As a result of such efforts, a negative electrode material made from a graphite based material which has been developed can provide a negative electrode exhibiting a capacity exceeding 360 mAh/g compared to the theoretical capacity of graphite of 372 mAh/g, which is the maximum capacity which can theoretically be obtained by a negative electrode made from a negative electrode material composed entirely of graphite. Therefore, increases in the capacity of batteries having a negative electrode obtained using a graphite material as a negative electrode material by improving graphite based materials themselves have nearly reached a limit.

Under such circumstance, as a method of further increasing the capacity of a negative electrode, it has recently been attempted to increase the density of a negative electrode by compressing a negative electrode material made from a graphite based material. In order to increase the density of a negative electrode by compression of a negative electrode material, it is necessary for a graphite based material to deform and fill vacant spaces between adjacent particles when the graphite based material is compressed to form a negative electrode. Therefore, from the standpoint of increasing the electrode density, a soft graphite based material is preferred.

In this regard, graphite based materials made from highly crystalline graphite such as natural graphite (referred to below as highly crystalline graphite particles) are very soft because they easily develop interlayer sliding. Therefore, highly crystalline graphite particles readily deform. Accordingly, use of highly crystalline graphite particles as a raw material makes it possible to easily obtain a negative electrode material capable of providing a negative electrode with a high density.

However, due to the softness of highly crystalline graphite particles, the formation of a large number of closed pores occurs inside a negative electrode obtained by compressing a negative electrode material made solely from highly crystalline graphite particles. This caused the problem that the charge acceptance of the resulting negative electrode decreased.

Charge acceptance is an index of how smoothly a negative electrode material reacts with lithium ions. If it is low, precipitation of lithium metal takes place during charging. In the present invention, charge acceptance is defined by the charging capacity of a negative electrode, which is measured by the method described below in examples.

In order to overcome the problem of a decrease in charge acceptance, the following means have been employed.

(i) The surface of highly crystalline graphite particles is coated with low crystallinity carbon. The resulting graphite based material is referred to below as coated graphite particles.

(ii) Low crystallinity carbon is locally adhered to the surface of highly crystalline graphite particles. The resulting graphite based material is referred to below as adhered graphite particles.

The low crystallinity carbon material present on the surface of coated graphite particles and adhered graphite particles is very hard, and hence both of these graphite based materials have a high overall hardness. Therefore, interlayer sliding is suppressed in highly crystalline graphite particles inside a graphite based material. Accordingly, with a negative electrode obtained by compressing a negative electrode material made of coated graphite particles and/or adhered graphite particles, the formation of closed pores in the interior of the negative electrode is suppressed, and as a result, a decrease in the charge acceptance of the negative electrode is suppressed.

However, in this case, since the graphite based material which constitutes the negative electrode material is very hard, it is necessary to increase the compressive force applied to the negative electrode material which is compressed in order to obtain a negative electrode. Therefore, when it is not possible to adequately compress the negative electrode material due to equipment limitations, for example, it is not possible to increase the density of the negative electrode.

Even when there are no equipment limitations and it is possible to adequately compress a negative electrode material, if a negative electrode material containing coated graphite particles and/or adhered graphite particles is excessively compressed in order to obtain a high density negative electrode, marked crushing of the hard carbon material present on the surface of the coated graphite particles and/or adhered graphite particles occurs. Crushing of the carbon material on the surface forms a large number of new surfaces on the negative electrode material constituting the negative electrode, and a SEI (solid electrolyte interface) film is formed on the newly formed surfaces. This SEI film causes the problem of an increase in the irreversible capacity (charging capacity minus discharge capacity) of a battery.

Concerning this problem, Patent Document 1 discloses mixing flake graphite particles with coated graphite particles having their surface coated with a hard carbon material made from amorphous carbon. The flake graphite particles are easily crushed and act as a cushion. Therefore, incorporation of the flake graphite particles suppresses crushing of coated graphite particles during rolling of a negative electrode, thereby suppressing an increase in specific surface area. It is disclosed in that document that a decrease in charge and discharge efficiency is thereby suppressed.

Patent Document 2 discloses mixing coated graphite particles with a graphite based material obtained by heat treatment at a high temperature of graphite particles prepared by spheroidizing pulverization of natural flake graphite (see claim 4 and Example 6, for example). Patent Documents 3 and 4 propose mixing coated graphite particles with uncoated graphite particles.

Patent Document 5 discloses maintaining pores by mixing uncoated graphite particles having a large particle diameter with hard coated graphite particles having a small particle diameter. Patent Document 6 discloses mixing hard coated graphite particles which are coated with amorphous carbon or turbostratic carbon with uncoated graphite particles.

PRIOR ART DOCUMENTS

Patent Documents

Patent Document 1: JP 2000-138061 A
Patent Document 2: JP 2006-49288 A
Patent Document 3: JP 2001-185147 A
Patent Document 4: JP 2005-44775 A
Patent Document 5: JP 2008-140707 A
Patent Document 6: JP 2005-294011 A

DISCLOSURE OF INVENTION

In Patent Document 1, however, because the coated graphite particles or flake graphite particles which are used are not suitable, the density of the resulting negative electrode is not sufficiently increased even if a high compressive force is applied to a negative electrode material.

Specifically, in Examples 1-6 of Patent Document 1, artificial graphite (HAG-5) manufactured by Nippon Graphite Industries, Ltd. is used as cores for coated graphite particles. Due to the cores which are extremely hard, the resulting coated graphite particles (HAG-5P) are also hard. Therefore, even if a high pressure of 1.8 tons/cm$^2$ is applied to the resulting mixed material, the density of the resulting electrode is increased to no greater than 1.52 g/cm$^3$ (Table 1 of Patent Document 1). In addition, the discharge capacity of this electrode is a low value of at most 307 mAh/g.

In Examples 7-9 of Patent Document 1, mesocarbon microbeads, which are a hard material, are used as cores for a carbon material having a coating layer on its surface. In this case, a pressure of at least 2 tons/cm$^2$ is applied in order to increase the density of an electrode obtained from this mixed material. In addition, the discharge capacity of a battery using this negative electrode is a low value of at most 335 mAh/g. Moreover, this patent document does not mention the charge acceptance of a negative electrode or the irreversible capacity of a battery.

Patent Document 2 does not sufficiently consider coated graphite particles and particularly the relationship between the hardness of coated graphite particles and uncoated graphite based materials, and the irreversible capacity calculated from the examples is 25 mAh/g or greater. Therefore, this patent document does not provide a battery having a low irreversible capacity. Furthermore, the results of charge and discharge efficiency shown in the examples are for the case when the negative electrode density is 1.63 g/cm$^3$, and it is thought that if the density of the negative electrode is further increased, the hard carbon material present on the surface of the coated graphite particles will be crushed, and the irreversible capacity of the battery will increase.

Patent Documents 3 and 4 only disclose examples in which the negative electrode has a low density since the upper limit on the density of a negative electrode in the examples is around 1.5 g/cm$^3$. Moreover, in the examples, uncoated graphite particles which are mixed have a large particle diameter. Therefore, when the added amount of graphite particles is small, if the pressure applied to a negative electrode material is increased in order to increase the density of a negative electrode to the same level as employed in the other documents, the hard carbon material present on the surface of the coated graphite particles will be further crushed. Therefore, a SEI film is easily formed on a negative electrode material constituting the resulting negative electrode. Accordingly, it is thought that the irreversible capacity of the battery increases. On the other hand, when the added amount of graphite particles is large, it is through that if the pressure applied to a negative electrode material is increased, the formation of closed pores will easily occur inside the resulting negative electrode and the charge acceptance will worsen.

In the carbon material according to Patent Document 5, uncoated graphite particles easily deform. Therefore, the contact area between particles of the negative electrode material within a negative electrode increases, and the area within the negative electrode which contacts an electrolyte decreases. Accordingly, pores in the negative electrode which are available for insertion of lithium ions are decreased in number, leading to a decrease in the charge acceptance.

For the same reasons as the carbon material according to Patent Document 5, it is difficult to realize a higher capacity with the carbon material according to Patent Document 6. It is conceivable to increase the number of pores available for insertion of lithium ions in a negative electrode by decreasing the size of uncoated graphite particles. However, in this case, it is presumed that the specific surface area of the negative electrode material will increase and the irreversible capacity of the battery will also increase.

The object of the present invention is to provide a carbon material which is suitable as a negative electrode material capable of providing a nonaqueous secondary battery which has a negative electrode with a high capacity due to having a high density as well as a high charge acceptance and which suppresses an increase in irreversible capacity.

In order to achieve this object, one aspect of the present invention provides a mixed carbon material comprising carbon material A and carbon material B, wherein carbon material A and carbon material B both have cores made from graphite powder and a surface carbon material adhered to and/or coated on at least a portion of the surface of the graphite powder, the surface carbon material being at least one of amorphous carbon and turbostratic carbon, and wherein the below-defined compressed density is 1.80-1.90 g/cm$^3$ for carbon material A alone, 1.45-1.65 g/cm$^3$ for carbon material B alone, and 1.75-1.84 g/cm$^3$ for the mixed carbon material, the average particle diameter of carbon material B is at most 14 µm and is smaller than the average particle diameter of carbon material A, and the specific surface areas of carbon material A and carbon material B are at most 4 m$^2$/g and at most 6 m$^2$/g, respectively.

The compressed density is the density when 1.00 grams of a powder are packed into a cylindrical mold having a diameter of 15 mm, a pressing force of 8.7 kN is applied to the powder, and then the force is reduced to 0.15 kN.

The above-described mixed carbon material preferably has a mixing ratio of carbon material A to carbon material B of from 90:10 to 60:40 as a mass ratio.

From another aspect, the present invention provides a negative electrode for a nonaqueous secondary battery made from a negative electrode material which comprises the above-described mixed carbon material.

When a carbon material according to the present invention is compressed, carbon material A which has a larger average particle diameter and a lower hardness than carbon material B suitably deforms and fills spaces which arise between particles of the carbon material. On the other hand, since carbon material A has a suitable carbon coating, carbon material A does not readily undergo excessive deformation. Accordingly, when a negative electrode material made from a carbon material according to the present invention is subjected to pressure in order to increase the density of a negative electrode and is formed into a negative electrode, an excessive increase in the contact surface area between particles of the resulting negative electrode is suppressed. Therefore, it is possible to maintain an adequate number of pores for Li ion insertion which can contact an electrolyte. Accordingly, the resulting negative electrode has good charge acceptance despite having a high density.

Furthermore, a mixed carbon material according to the present invention has a low specific surface area because of a surface carbon material in the form of amorphous carbon and/or turbostratic carbon which is adhered to and/or coated on both carbon material A and carbon material B. Therefore, a battery having a negative electrode using a negative electrode material made from a carbon material according to the present invention has a low irreversible capacity.

Accordingly, a nonaqueous secondary battery and particularly a lithium ion secondary battery having a negative electrode manufactured using such a carbon material as a negative electrode material has a high capacity brought due to having a high negative electrode density while achieving a high charge acceptance, and it also has a low irreversible capacity.

MODES FOR CARRYING OUT THE INVENTION

Below, a mixed carbon material according to the present invention, which is suitable for use in a nonaqueous secondary battery and particularly a lithium ion secondary battery, will be explained with respect to the form, the range of manufacturing conditions, and the reasons why they are set.

1. Carbon Material A

Carbon material A according to the present invention comprises graphite powder which forms cores and a carbon material which is adhered to and/or coated on at least a portion of the surface of the graphite powder.

The carbon material which is adhered to and/or coated on at least a portion of the surface of the graphite powder (such carbon material being referred to in this description as a surface carbon material) is at least one of amorphous carbon and turbostratic carbon. Carbon material A has a compressed density which is defined below of 1.80-1.90 g/cm$^3$, an average particle diameter which is larger than the average diameter of carbon material B, and a specific surface area of at most 4 m$^2$/g.

(1) Compressed Density

In the present invention, the compressed density is defined as the density of a powder when 1.00 grams of the powder are packed into a cylindrical mold having a diameter of 15 mm, a pressing force of 8.7 kN is applied to the powder, and then the pressing force is reduced to 0.15 kN. It is an index of the hardness of the powder. The density of the powder when the pressure is reduced can be determined from the volume of the powder, which is calculated from the height of the powder in the mold after the pressure is reduced.

In the present invention, the compressed density of carbon material A is larger than the compressed density of below-described carbon material B, which means that carbon material A has a lower hardness than carbon material B. When a mixed carbon material comprising carbon material A and carbon material B is compressed, carbon material A preferentially deforms and fills gaps present between particles of the carbon material. Accordingly, it is realized that a negative electrode obtained by compressing the mixed carbon material has an increased density.

The compressed density of carbon material A depends on the particle diameter of carbon material A and on the type and amount of the surface carbon material of carbon material A. As a basic tendency, the smaller the particle diameter of carbon material A, the lower is the compressed density, and as the amount of the surface carbon material increases, the compressed density decreases.

When the compressed density of carbon material A exceeds 1.90 g/cm$^3$, the amount of the surface carbon material is too small. As a result, when pressure is applied to form a negative electrode, particles intimately contact each other. Therefore, the surface of the negative electrode which is in contact with an electrolyte decreases, resulting in a decrease in the charge acceptance of the negative electrode. On the other hand, when the compressed density of carbon material A is less than 1.80 g/cm$^3$, it is difficult to provide a negative electrode with a high density sufficient to achieve a high capacity, and it is necessary to increase the applied pressure at the time of forming the negative electrode in order to increase the density. As a result, the surface carbon of not only carbon material A but also of carbon material B is crushed, and a SEI film is formed on the new surfaces which are formed in fractured portions. Accordingly, when the compressed density is less than 1.80 g/cm$^3$, there is a tendency for the irreversible capacity to increase. For the above reasons, the compressed density of carbon material A according to the present invention is 1.80-1.90 g/cm$^3$, and from the standpoint of achieving a particularly high capacity and charge acceptance of a negative electrode and of particularly suppressing the irreversible capacity of a battery, the compressed density is preferably 1.82-1.87 g/cm$^3$.

(2) Graphite Powder

There are no particular limitations on the graphite powder which forms the cores of carbon material A according to the present invention. From the standpoint of increasing economy, it is preferable to use natural graphite powder. Among natural graphite powder, it is particularly preferable to use powder formed from natural flake graphite. It is also possible to use natural flake graphite which has been spheroidized. From the standpoints of realizing a high capacity and ease of deformation, the carbon interlayer distance (d002) of the graphite is preferably 0.336 nm or smaller.

(3) Average Particle Diameter

In the present invention, the average particle diameter means the particle diameter D50 at 50 volume % in a cumulative particle diameter distribution, which is measured by a laser diffraction particle size distribution analyzer.

The average particle diameter of carbon material A according to the present invention is made larger than the average particle diameter of below-described carbon material B.

The average particle diameter of carbon material A is preferably at least 20 μm. If the average particle diameter is excessively smaller than 20 μm, the compressed density becomes too small, and it may become difficult to increase the density of a negative electrode obtained by compressing a mixture of carbon material A and carbon material B. In this case, if the mixed carbon material is overly compressed in order to increase the density of a negative electrode, the coating may be crushed and the irreversible capacity may increase.

A more preferred range for the average particle diameter of carbon material A is 20-40 μm. When the average particle diameter exceeds 40 μm, there is an increased possibility of problems occurring during the process of manufacturing an electrode. A particularly preferred range for the average particle diameter of carbon material A is 20-30 μm. This is because when the average particle diameter is 30 μm or less, the specific surface area of the graphite powder which forms cores is increased, and the number of openings for insertion of lithium ions in a negative electrode becomes large, thereby making it possible to expect an increased charge acceptance.

(4) Specific Surface Area

In the present invention, the specific surface area is the value obtained by the BET method using nitrogen gas adsorption in a conventional manner. The specific surface area of carbon material A according to the present invention is at most 4 $m^2/g$. When the specific surface area is too high, the amount of surface carbon is small and/or the average particle diameter is small. As a result, there is a possibility of a decrease in the charge acceptance or an increase in the irreversible capacity.

(5) Surface Carbon Material

I) Structure

As described above, carbon material A according to the present invention has a surface carbon material which is present on the surface of graphite powder which forms cores, and the surface carbon material is at least one of amorphous carbon and turbostratic carbon.

Turbostratic carbon means a carbon material in which carbon atoms form a layer structure stacked parallel to the direction of a hexagonal network plane but their crystalline regularity in the three-dimensional direction cannot be measured. In an x-ray diffraction pattern, the hkl diffraction line does not appear (101, 103, and the like). However, in a composite material according to the present invention, the graphite powder which forms cores has strong diffraction lines, so it is difficult to identify a turbostratic structure by x-ray diffraction of carbon material A. Therefore, it is preferably identified by TEM or the like.

Amorphous carbon means a carbon material which has a short range order (a range on the order of from several atoms to ten-some atoms) but does not have a long range order (a range on the order of from several hundred to several thousand atoms).

The ratio of sp2 bonds to sp3 bonds in amorphous carbon varies with the manufacturing method, but in general, the proportion of sp3 bonds in amorphous carbon is higher than that in turbostratic carbon. Therefore, the hardness of amorphous carbon is frequently higher than that of turbostratic carbon. In either case, since the hardness of these types of carbon materials is higher than the hardness of graphite powder which forms cores, carbon material A which has a surface carbon material selected from these carbon materials on its surface has a higher compressive strength than the graphite particles forming cores, which is typically natural graphite.

II) Adhesion and Coating Methods

There are no particular limitations on a method of adhering or coating either of the above-described turbostratic carbon or amorphous carbon on the surface of graphite powder. Typical examples are the following surface treatment method and deposition method using vacuum film forming techniques. Whichever method is used, a carbon material is adhered to or coated on the surface, so the particle diameter of carbon material A becomes somewhat larger than that of the graphite powder forming cores. For example, with the surface treatment method, the particle diameter typically increases by several nanometers to around 5 micrometers.

i) Surface Treatment Method

This method is a method in which an organic compound such as pitch is previously adhered to or coated on a portion of the surface of graphite powder and heat treatment is then performed to carbonize the organic compound. A carbon material which is adhered or coated by this method is turbostratic carbon.

Specific examples of a method of coating an organic compound on the surface of graphite powder are as follows.

(a) An organic compound such a pitch is heated to melt and the melt is then blended with graphite powder.

(b) Graphite powder is immersed in an organic compound such as pitch which has been formed into a liquid state and the powder is then washed with a solvent to remove the excess organic compound.

(c) An organic compound such as pitch which has been formed into a liquid state is mixed with graphite powder and the mixture is heated while stirring.

A specific example of a method of adhering an organic compound to graphite powder is a method in which pitch powder with an average particle diameter of at most 500 μm and graphite powder are mixed in a solid phase. There are no particular limitations on a means for carrying out this mixing, and a V-blender may be used, for example.

An example of heat treatment conditions for carbonizing an organic compound is a heat treatment temperature of 850-2000° C. If the heat treatment temperature is excessively higher than 2000° C., the surface carbon material does not become either amorphous carbon or turbostratic carbon, and graphite having little disorder in its crystal structure is formed. As a result, it is no longer possible to realize an increase in the hardness of the carbon material due to the surface carbon material. The duration of heat treatment can be suitably selected depending upon the temperature and the properties of the organic compound, and typically it is 1 hour. The heat treatment atmosphere is an inert atmosphere or a vacuum so that oxidation will not occur. From the standpoint of economy, a nitrogen atmosphere is preferred.

(ii) Deposition Method

There are no particular limitations on a vacuum film forming technique which can be applied in the present invention as long as amorphous carbon and/or turbostratic carbon can be deposited on the surface of graphite powder. Chemical vapor deposition (CVD) or sputtering may be used. Vacuum deposition, the plasma method, ion plating, ion beam sputtering, and the like can also be used.

2. Carbon Material B

In the same manner as carbon material A, carbon material B according to the present invention has a surface carbon material on at least a portion of the surface of cores made of graphite powder. In the same manner as carbon material A, the surface carbon material on carbon material B is at least one of amorphous carbon and turbostratic carbon.

The compressed density of carbon material B is 1.45 $g/cm^3$-1.65 $g/cm^3$, the average particle diameter of carbon material B is smaller than the average particle diameter of carbon material A and is at most 14 µm, and the specific surface area of carbon material B is at most 6 $m^2/g$.

(1) Compressed Density

If the compressed density of carbon material B according to the present invention exceeds 1.65 $g/cm^3$, carbon material B becomes excessively soft. Therefore, at the time of compression, deformation of carbon material B becomes marked, and the formation of closed pores occurs inside a negative electrode made from the mixed carbon material, resulting in a decreased charge acceptance.

On the other hand, if the compressed density is less than 1.45 $g/cm^3$, carbon material B becomes too hard. As a result, the surface carbon material of carbon material A which contacts carbon material B at the time of compression is crushed and the irreversible capacity increases.

(2) Natural Graphite Powder

There are no particular limitations on the graphite powder forming the cores of carbon material B according to the present invention, but from the standpoint of increasing economy, it is preferable to use natural graphite powder. Among natural graphite powders, it is particularly preferable to use powder formed from natural flake graphite. Spheroidized natural flake graphite may be used. From the standpoints of achieving a high capacity and ease of deformation, graphite having a carbon interlayer distance (d002) of at most 0.336 nm is preferred.

(3) Average Particle Diameter

As stated above, the average particle diameter of carbon material B is less than or equal to the average particle diameter of carbon material A and is at most 14 µm. If the average particle diameter is larger than 14 µm, it becomes easy for closed pores to form in a negative electrode, and a decrease in the charge acceptance of the negative electrode may occur.

A preferred range for the average particle diameter of carbon material B is at least 7 µm to at most 14 µm. If the average particle diameter is less than 7 µm, the specific surface area of carbon material B becomes large and there is a possibility of an increase in irreversible capacity. Accordingly, fine powder is preferably removed by a suitable means such as air classification.

(4) Specific Surface Area

The specific surface area of carbon material B according to the present invention is at most 6 $m^2/g$. When the specific surface area is too large, the irreversible capacity increases. In addition, at the time of electrode preparation, a large amount of solvent becomes necessary and handling becomes difficult. Therefore, from the standpoint of improving operation efficiency, the specific surface area is preferably not too high.

3. Mixed Carbon Material

A mixed carbon material according to the present invention is obtained by mixing the above-described carbon material A and carbon material B with a mixing ratio such that the compressed density of the carbon material after mixing (mixed carbon material) is in the range of 1.75-1.84 $g/cm^3$. If the compressed density of the mixed carbon material is smaller than the above-described range, the pressing force necessary to obtain a prescribed density becomes large. As a result, the surfaces of carbon materials A and B are easily crushed, and the irreversible capacity of a battery increases. On the other hand, if it is larger than the above-described upper limit for the mixed carbon material, closed pores easily form inside the resulting electrode, and a tendency is observed for the charge acceptance of a negative electrode to decrease.

The mixing ratio of carbon material A to carbon material B is preferably in the range of from 90:10 to 60:40 as a mass ratio in order to stably achieve a compressed density of the mixed carbon material in the above-described range. It is still more preferably in the range of from 85:15 to 70:30.

Carbon material A and carbon material B which constitute a mixed carbon material according to the present invention both have all or a portion of their surface covered by a carbon material which is harder than the graphite powder forming cores. With such a structure, even if the relatively soft material (which is carbon material A in the present invention) deforms, the specific surface area is prevented from excessively increasing and an increase in irreversible capacity is suppressed.

In addition, carbon material A which preferentially deforms at the time of compression is coated by a hard carbon material, so the contact surface area between carbon material A and carbon material B is prevented from becoming too large. This means that a large amount of the surface coating of the carbon materials is present even after compression. Accordingly, it becomes difficult for the number of pores for insertion of lithium ions into the carbon material in a negative electrode to excessively decrease. This means that a large number of pores remain between the carbon materials after compression. Accordingly, diffusion of lithium ions inside a negative electrode is not impeded easily. A decrease in the number of pores for insertion of lithium ions and impedance of diffusion of lithium ions are both a cause of a decrease in charge acceptance. Therefore, a negative electrode obtained from a mixed carbon material according to the present invention has excellent charge acceptance.

Thus, with a mixed carbon material according to the present invention, both carbon material A and carbon material B have a hard surface carbon material, and carbon material A is softer and has a larger particle diameter and carbon material B is harder and has a smaller particle diameter within a certain range. By having such a structure, a nonaqueous secondary battery manufactured using this mixed carbon material as a negative electrode material has the excellent properties as evidenced by a high charge acceptance and a low irreversible capacity while maintaining a high capacity due to a high density of the negative electrode.

4. Manufacturing Method

A mixed carbon material according to the present invention can be obtained by mixing carbon material A and carbon material B according to the present invention by a known method (such as using a known V-blender). There are no particular limitations on the mixing conditions (atmosphere, temperature, and the like). Mixing in air at room temperature is preferable from the standpoint of increasing economy.

A mixed carbon material which is manufactured by the above-described method is blended with a binder and a thickener in appropriate amounts and compressed to form a negative electrode. Known materials such as polyvinylidene fluoride, styrene butadiene rubber (SBR), and the like can be used as a binder, and known materials such as carboxymethyl cellulose (CMC), polyvinyl alcohol, and the like can be used as a thickener. The amounts of these materials can be within the ranges which are typically used for each of these materials. As an example, SBR is used in an amount of 1-3 mass % and CMC is used in an amount of 0.5-2 mass %.

EXAMPLES

The present invention will be explained more specifically by the following examples, but the present invention is not limited by these examples.

1. Preparation of Negative Electrode Material

In the following examples and comparative examples, "parts" indicates parts by mass unless otherwise specified.

In the examples and comparative examples, the average particle diameter was the particle diameter at a volume fraction of 50% determined using a laser diffraction/scattering type particle size distribution analyzer (Model LA-910, manufactured by Horiba, Ltd). In this measurement, the dispersion medium used was water to which 0.1 mass % of a surface active agent containing an alkyl glycoxide was added, dispersion was carried out by ultrasonic dispersion for 5 minutes, and the laser transmittance at the time of measurement was 85-95%. The specific surface area was the value measured by the BET method by nitrogen gas adsorption using a Quantasorb apparatus manufactured by Yuasa Ionics, Ltd.

The compressed density of powder was measured by the following method. 1.00 grams of a powder sample were packed into a mold with a diameter of 15 mm, the powder was compressed by applying a force of 8.7 kN with a uniaxial press for 5 seconds, then the force was reduced to 0.15 kN, and the displacement at this time was measured. The speed of pressing was at most 10 mm/sec. Without packing a sample into a mold, pressing was performed to 8.7 kN, then the force was reduced to 0.15 kN, and the displacement at this time was used as a reference. The difference between the displacement when packing took place and the reference displacement was determined as the sample thickness, and the compressed density was calculated from this thickness.

Example 1

Carbon materials A and B which were obtained by the following manufacturing method were mixed in the mixing ratio (mass ratio) shown in Table 1 to obtain a mixed carbon material for use as a negative electrode material. The results of measurement of the compressed density by the above-described method for these carbon materials were as shown in Table 1.

(1) Carbon Material A 100 parts by mass of graphite powder having an average particle diameter of 30 μm and a specific surface area (S1) of 3.6 m$^2$/g which was prepared by spheroidizing treatment of natural flake graphite were subjected to solid state mixing in a V-blender with one part by mass of coal tar pitch powder having an average particle diameter of 35 μm and a softening point of 85° C.

The resulting mixed powder was placed in a stationary state in a heating furnace and heat-treated for 1 hour at 1000° C. in a nitrogen gas stream. The furnace was then allowed to cool to room temperature in a nitrogen gas stream to obtain carbon material A made of graphite powder and a surface carbon material in the form of turbostratic carbon produced by carbonization of pitch and adhered to the surface of the graphite powder.

(2) Carbon Material B 100 parts by mass of graphite powder with an average particle diameter of 11 μm and a specific surface area (S1) of 6.8 m$^2$/g which was obtained by spheroidizing treatment of natural flake graphite powder were subjected to solid state mixing in a V-blender with 10 parts by mass of coal tar pitch powder with an average particle diameter of 35 μm and a softening point of 85° C.

The resulting mixed powder was placed in a stationary state in a heating furnace and heat-treated for 1 hour at 1000° C. in a nitrogen gas stream. Then, the furnace was allowed to cool to room temperature in a nitrogen gas stream to obtain carbon material B made of graphite powder and a surface carbon material in the form of turbostratic carbon produced by carbonization of pitch and adhered to the surface of the graphite powder.

Examples 2-11, Comparative Examples 5-13

Carbon materials A and B were mixed in the mixing ratios (mass ratios) shown in Table 1 to obtain negative electrode materials. The results of measurement of the compressed density by the above-described method of these carbon materials were as shown in Table 1.

Carbon material B used in Example 11 underwent heat treatment for one hour in a nitrogen gas stream at a treatment temperature of 2000° C.

Comparative Example 1

Natural graphite powder which did not have turbostratic carbon adhered to its surface was used as carbon material B.

Comparative Examples 2-4

Natural graphite powder which did not have turbostratic carbon adhered to its surface was used as carbon material A.

2. Evaluation of Negative Electrode Properties

The properties of negative electrodes made from negative electrode materials obtained in the above-described examples and comparative examples were investigated in the following manner.

(1) Preparation of Negative Electrode 97 parts of a negative electrode material were mixed with CMC (sodium carboxymethyl cellulose) which was used as a binder. A dispersion of SBR (styrene butadiene rubber) in water was added to the resulting mixture and stirring was performed to obtain a slurry. The mixing ratio as a mass ratio was negative electrode material:CMC:SBR=97:1:2. This slurry was applied by the doctor blade method atop a copper foil having a thickness of 17 μm (coating weight of 10 mg/cm$^2$) and dried. The dried member was punched to form a circular pellet with a diameter of 13 mm. The pellet was compressed using a press to prepare an electrode. The force applied by the press was adjusted so that the resulting electrode would have a density of around 1.80 g/cm$^3$.

The density of the resulting electrode was determined by measuring its thickness with a micrometer and its mass. Specifically, the thickness and the mass of portions other than the copper foil were determined by subtracting the previously measured thickness and mass of the copper foil from the measured values for the electrode, and the density of the electrode was determined from these values.

Electrodes with a density of 1.78-1.82 g/cm³ were obtained by the above-described method. The following evaluation was carried out using the resulting electrodes as negative electrodes.

(2) Preparation of a Nonaqueous Test Cell

A nonaqueous solution which was used as an electrolyte was prepared by dissolving $LiPF_6$ as a supporting electrolyte in a mixed solvent of ethylene carbonate (EC) and ethyl methyl carbonate (EMC) in a ratio of EC:EMC=1:3 (volume ratio) so that the concentration of $LiPF_6$ was 1 M. A polyolefin separator, the above-described electrode (negative electrode), and a counter electrode (positive electrode) in the form of Li metal foil were disposed in a beaker containing the above-described electrolyte so that the two electrodes positioned on opposite sides of the separator. In this manner, a coin-shaped nonaqueous test cell was obtained.

In an evaluation using a Li counter electrode, basically, doping of a graphite negative electrode with Li is considered to be discharging. However, in the present example, a negative electrode material was evaluated. Therefore, in the following explanation, unless otherwise specified, the charging capacity means the capacity during doping, namely, the capacity on the negative electrode side, and the discharge capacity means the capacity during undoping, namely, the capacity on the positive electrode side.

(3) Measurement of Irreversible Capacity

The nonaqueous test cell was doped with a constant current of 25 mA/g until the potential difference with respect to the counter electrode became 0 V (corresponding to charging), and then while maintaining the potential difference at 0 V, doping was continued at a constant voltage until 5 µA/cm² was reached. The doping capacity was measured as the charging capacity. The temperature of the nonaqueous test cell was maintained at 23° C. during the doping.

Next, with a constant current of 25 mA/g, undoping was carried out until a potential difference of 1.5 V was achieved (corresponding to discharge), and the undoping capacity was measured as the discharge capacity. The nonaqueous test cell was also maintained at 23° C. during the undoping. The irreversible capacity was calculated as the value of the charging capacity minus the discharge capacity.

For the initial irreversible capacity, a value of less than 25 mAh/g was considered good and a value of 25 mAh/g or greater was considered poor.

This doping and undoping operation was repeated for three cycles in order to evaluate the below-described charge acceptance. The length of time from the completion of doping until the start of the next undoping was 1 minute, and the length of time from the completion of undoping until the start of the next doping was 1 minute. During these periods, the temperature of the nonaqueous test cell was also maintained at 23° C.

(4) Charge Acceptance

After the above-described three cycles, the nonaqueous test cell underwent doping with a constant current of 180 mA/g until the potential difference with respect to the counter electrode became 0 V (corresponding to charging). The charging capacity with a constant current at this time was used as an indicator of charge acceptance. A charging capacity of at least 170 mAh/g was evaluated as good, and a value of less than 170 mAh/g was evaluated as poor. The temperature of the nonaqueous test cell during this doping operation was maintained at 23° C.

TABLE 1

| | Average Particle diameter (µm) | | Pitch added (parts by mass) | | Specific surface area (m²/g) | | Compressed density (g/cm³) | | Mixing ratio (parts by mass) | | Specific surface area (m²/g) | Compressed density (g/cm³) | Irreversible capaciy (mAh/g) | Charge acceptance (mAh/g) |
|---|---|---|---|---|---|---|---|---|---|---|---|---|---|---|
| | A | B | A | B | A | B | A | B | A | B | | | | |
| Example 1 | 30 | 12 | 1.0 | 10.0 | 3.2 | 2.7 | 1.87 | 1.48 | 80 | 20 | 3.1 | 1.79 | 19 | 190 |
| Example 2 | 21 | 12 | 1.0 | 5.0 | 4.0 | 3.8 | 1.82 | 1.56 | 80 | 20 | 4.0 | 1.77 | 24 | 210 |
| Example 3 | 25 | 11 | 1.0 | 2.5 | 3.4 | 5.0 | 1.85 | 1.64 | 80 | 20 | 3.7 | 1.81 | 21 | 195 |
| Example 4 | 25 | 12 | 1.0 | 5.0 | 3.4 | 3.8 | 1.85 | 1.56 | 80 | 20 | 3.5 | 1.79 | 19 | 200 |
| Example 5 | 25 | 12 | 1.0 | 10.0 | 3.4 | 2.7 | 1.85 | 1.48 | 80 | 20 | 3.3 | 1.78 | 21 | 210 |
| Example 6 | 25 | 12 | 1.0 | 5.0 | 3.4 | 3.8 | 1.85 | 1.56 | 90 | 10 | 3.4 | 1.82 | 20 | 180 |
| Example 7 | 25 | 12 | 1.0 | 5.0 | 3.4 | 3.8 | 1.85 | 1.56 | 70 | 30 | 3.5 | 1.76 | 23 | 210 |
| Example 8 | 30 | 12 | 1.0 | 5.0 | 3.2 | 3.8 | 1.87 | 1.56 | 60 | 40 | 3.4 | 1.75 | 24 | 210 |
| Example 9 | 40 | 12 | 2.0 | 10.0 | 1.9 | 2.7 | 1.87 | 1.48 | 80 | 20 | 2.1 | 1.79 | 18 | 170 |
| Example 10 | 25 | 8 | 1.0 | 10.0 | 3.4 | 4.6 | 1.85 | 1.46 | 80 | 20 | 3.6 | 1.77 | 23 | 220 |
| Example 11 | 21 | 12 | 1.0 | 5.0 | 3.4 | 3.6 | 1.82 | 1.65 | 70 | 30 | 3.5 | 1.77 | 22 | 200 |
| Com. Ex. 1 | 25 | 11 | 1.0 | 0.0 | 3.4 | 6.8 | 1.85 | 1.80 | 80 | 20 | 4.1 | 1.84 | 28 | 135 |
| Com. Ex. 2 | 30 | 11 | 0.0 | 10.0 | 3.6 | 2.7 | 1.94 | 1.48 | 70 | 30 | 3.3 | 1.80 | 22 | 140 |
| Com. Ex. 3 | 25 | 12 | 0.0 | 10.0 | 4.2 | 2.7 | 1.92 | 1.48 | 70 | 30 | 3.8 | 1.79 | 23 | 150 |
| Com. Ex. 4 | 21 | 12 | 0.0 | 10.0 | 5.2 | 2.7 | 1.89 | 1.48 | 70 | 30 | 4.5 | 1.77 | 30 | 160 |
| Com. Ex. 5 | 25 | 6 | 1.0 | 5.0 | 3.4 | 8.9 | 1.85 | 1.45 | 80 | 20 | 4.5 | 1.77 | 28 | 210 |
| Com. Ex. 6 | 25 | 15 | 1.0 | 10.0 | 3.4 | 2.0 | 1.85 | 1.54 | 70 | 30 | 3.0 | 1.76 | 20 | 160 |
| Com. Ex. 7 | 18 | 12 | 2.0 | 5.0 | 4.0 | 3.8 | 1.74 | 1.56 | 80 | 20 | 4.0 | 1.70 | 30 | 210 |
| Com. Ex. 8 | 25 | 11 | 4.0 | 2.5 | 2.1 | 5.0 | 1.78 | 1.64 | 80 | 20 | 2.7 | 1.75 | 26 | 185 |
| Com. Ex. 9 | 25 | 11 | 1.0 | 2.0 | 3.4 | 5.3 | 1.85 | 1.67 | 80 | 20 | 3.8 | 1.81 | 25 | 160 |
| Com. Ex. 10 | 25 | 13 | 1.0 | 15.0 | 3.4 | 2.1 | 1.85 | 1.43 | 80 | 20 | 3.1 | 1.77 | 26 | 210 |
| Com. Ex. 11 | 25 | 12 | 1.0 | 5.0 | 3.4 | 3.8 | 1.85 | 1.56 | 60 | 40 | 3.6 | 1.73 | 26 | 220 |
| Com. Ex. 12 | 25 | 12 | 1.0 | 5.0 | 3.4 | 3.8 | 1.85 | 1.56 | 100 | 0 | 3.4 | 1.85 | 19 | 130 |
| Com. Ex. 13 | 21 | 12 | 0.5 | 5.0 | 4.3 | 3.8 | 1.85 | 1.56 | 70 | 30 | 4.2 | 1.76 | 26 | 190 |
| Com. Ex. 14 | 25 | 8 | 1.0 | 2.0 | 3.4 | 6.5 | 1.85 | 1.58 | 80 | 20 | 4.0 | 1.80 | 26 | 170 |
| Com. Ex. 15 | 30 | 12 | 0.3 | 10.0 | 3.4 | 2.7 | 1.91 | 1.48 | 70 | 30 | 3.2 | 1.78 | 23 | 160 |

The invention claimed is:

1. A mixed carbon material comprising carbon material A and carbon material B, wherein
    carbon material A and carbon material B both have cores made of graphite powder and a surface carbon material adhered to and/or coated on at least a portion of the surface of the graphite powder, the surface carbon material is at least one of amorphous carbon and turbostratic carbon, the compressed density characteristic which is defined below is 1.80-1.90 g/cm$^3$ for carbon material A alone, 1.45-1.65 g/cm$^3$ for carbon material B alone, and 1.75-1.84 g/cm$^3$ for the mixed carbon material, the average particle diameter of carbon material B is at most 14 μm and is smaller than the average particle diameter of carbon material A, and the specific surface areas of carbon material A and carbon material B are at most 4 m$^2$/g and at most 6 m$^2$/g, respectively, the compressed density characteristic being the density of a powder when 1.00 grams of the powder are packed into a cylindrical mold with a diameter of 15 mm, a pressing force of 8.7 kN is applied to the powder, and then the pressing force is reduced to 0.15 kN.

2. A mixed carbon material as set forth in claim 1 wherein the mixing ratio of carbon material A to carbon material B is from 90:10 to 60:40 as a mass ratio.

3. A negative electrode for a nonaqueous secondary battery having a negative electrode material including a mixed carbon material comprising carbon material A and carbon material B, wherein carbon material A and carbon material B both have cores made of graphite powder and a surface carbon material adhered to and/or coated on at least a portion of the surface of the graphite powder, the surface carbon material is at least one of amorphous carbon and turbostratic carbon, the compressed density characteristic which is defined below is 1.80-1.90 g/cm$^3$ for carbon material A alone, 1.45-1.65 g/cm$^3$ for carbon material B alone, and 1.75-1.84 g/cm$^3$ for the mixed carbon material, the average particle diameter of carbon material B is at most 14 μm and is smaller than the average particle diameter of carbon material A, and the specific surface areas of carbon material A and carbon material B are at most 4 m$^2$/g and at most 6 m$^2$/g, respectively, the compressed density characteristic being the density of a powder when 1.00 grams of the powder are packed into a cylindrical mold with a diameter of 15 mm, a pressing force of 8.7 kN is applied to the powder, and then the pressing force is reduced to 0.15 kN.

4. A negative electrode for a nonaqueous secondary battery as set forth in claim 3 wherein the mixing ratio of carbon material A to carbon material B is from 90:10 to 60:40 as a mass ratio.

* * * * *